United States Patent
Skiba et al.

(10) Patent No.: US 10,475,042 B2
(45) Date of Patent: Nov. 12, 2019

(54) PUBLIC NON-COMPANY CONTROLLED SOCIAL FORUM RESPONSE METHOD

(71) Applicant: Avaya Inc., Basking Ridge, NJ (US)

(72) Inventors: David Skiba, Golden, CO (US); Peter Finney, Stevenage (GB); Andrew Maher, Wiesbaden (DE)

(73) Assignee: Avaya Inc., Basking Ridge, NJ (US)

( * ) Notice: Subject to any disclaimer, the term of this patent is extended or adjusted under 35 U.S.C. 154(b) by 748 days.

(21) Appl. No.: 14/273,255

(22) Filed: May 8, 2014

(65) Prior Publication Data

US 2015/0324805 A1  Nov. 12, 2015

(51) Int. Cl.
*G06Q 10/06* (2012.01)
*G06Q 30/00* (2012.01)
*G06Q 50/00* (2012.01)

(52) U.S. Cl.
CPC ..... *G06Q 30/016* (2013.01); *G06Q 10/06311* (2013.01); *G06Q 50/01* (2013.01)

(58) Field of Classification Search
CPC ...................................................... G06Q 10/06
See application file for complete search history.

(56) References Cited

U.S. PATENT DOCUMENTS

| | | | |
|---|---|---|---|
| 8,634,543 B2 | 1/2014 | Flockhart et al. | |
| 2004/0128619 A1* | 7/2004 | McCall | G06Q 30/02 715/205 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0145034 A1* | 6/2011 | Moore | G06Q 10/00 705/7.17 |
| 2012/0072358 A1* | 3/2012 | Famous | G06Q 30/01 705/319 |
| 2012/0303659 A1 | 11/2012 | Erhart et al. | |
| 2013/0262598 A1* | 10/2013 | Makanawala | H04L 51/32 709/206 |
| 2013/0282603 A1* | 10/2013 | Gaedcke | G06Q 30/016 705/319 |

(Continued)

OTHER PUBLICATIONS

Website entitled "Social Media Monitoring made easy with Sysomos," Sysomos Inc., © 2005-2014, 4 pages, retrieved on May 12, 2014 from https://www.sysomos.com/social-media-monitoring/.

(Continued)

*Primary Examiner* — Kurtis Gills
(74) *Attorney, Agent, or Firm* — Sheridan Ross P.C.

(57) ABSTRACT

Users may post issues and questions on public social media websites and other public forums. A business or product of the business may be the subject of the post. With a properly trained system the business can determined if another community member is likely provide and accurate, sufficient, and timely response to the post. If so, the business can avoid allocating resources to respond to such posts. However, if it is determined that an appropriate response is not likely, or not likely within an acceptable timeframe, the business may notify an agent to provide an appropriate response. As a benefit, the business may leverage a community of knowledgeable users to provide assistance to other users and thereby not expend resources unnecessarily.

20 Claims, 3 Drawing Sheets

(56) References Cited

U.S. PATENT DOCUMENTS

| | | | |
|---|---|---|---|
| 2014/0032254 A1* | 1/2014 | Della Corte | G06Q 30/016 705/7.14 |
| 2014/0074952 A1* | 3/2014 | White | G06Q 10/107 709/206 |
| 2014/0120515 A1* | 5/2014 | Mahmud | G09B 7/00 434/362 |
| 2015/0319115 A1* | 11/2015 | Cudak | H04L 51/046 709/206 |

OTHER PUBLICATIONS

Giordano "Answer My Tweet!: Customer Service and Social Media," socialmediatoday, Jan. 25, 2013, 2 pages.
U.S. Appl. No. 13/904,361, filed May 29, 2013, Finney et al.
U.S. Appl. No. 14/047,812, filed Oct. 7, 2013, Skiba et al.
U.S. Appl. No. 14/104,471, filed Dec. 12, 2013, Shaffer et al.
U.S. Appl. No. 14/133,251, filed Dec. 18, 2013, Skiba et al.

\* cited by examiner

US 10,475,042 B2

PUBLIC NON-COMPANY CONTROLLED SOCIAL FORUM RESPONSE METHOD

FIELD OF THE DISCLOSURE

The present disclosure is generally directed toward providing assistance to users on public social media websites and other computer-based public forums.

BACKGROUND

Today, many companies monitor message boards, social media pages, and other domain-based forums related to their businesses. On these sites, customers will posts problems, suggestions, complaints, etc. with the goal of hearing from other people/customers about possible solutions. The unique attribute of these sites, compared to company websites, is that they are public and not controlled by the company that is monitoring the site. This provides customers a way to get information from non-company sources that may include unbiased opinions and options, including ones the company may not want to state or highlight. This may be an advantage to the company, such as when customer advocates of the brand provide correct and positive "free" support and help regarding products and services. This has the potential to considerably reduce the cost of company-provided support.

One problem a company will face in this endeavor is that to foster an active user community of people to address issues, the company must allow time for the user community to address the issues. Since the customers are not usually paid to provide this support, it could be minutes, hours, or days before an answer appears. If the company provides appropriate staff and answers everything quickly, the company may lose the benefit and engagement of consumer advocates. If the company waits too long, customer satisfaction may be impacted.

Social media and forum communities often self-heal within 30 minutes of an original post when a company has nurtured the relationship with consumer advocates. Some companies incentivize the proactive consumer advocate engagement to develop community support. When a post is negative, a social engagement strategy adopted by some businesses is to wait for approximately 30 minutes to see if the self-healing takes place before the company engages. Some companies have policies to wait as long as several days. One key response time metric for first contact in the social media forum is less than 60 minutes with the perception that social customer care is available 24x7 (not just during standard business hours). Regardless of the time limits set by a company or expectations from the community, a second problem is that the monitoring and engagement is a manual and expensive process.

SUMMARY

It is with respect to the above issues and other problems that the embodiments presented herein were contemplated. Embodiments disclosed herein solve the forgoing and other problems and advances the state of the art by providing a social media website forum response system and method. The social media website forum response system and method provides automatic and continuous monitoring, analysis, quality prediction, and tracking of response times to ensure a satisfactory response is provided to customers and reduces duplicated efforts provided by the forum community.

As disclosed herein with respect to certain embodiments, public social media websites and domain forums are automatically monitored either continuously or periodically (e.g., at regular and predetermined intervals), such as through standard Application Programming Interfaces (APIs). As monitoring of the public social media website continues, an analysis model on each incoming interaction is generated and applied to the content of the website. The model serves to predict when a given post/problem might be responded to by proactive consumer advocates in the community and the probability of the answer(s) being sufficient and/or correct. The model is trained by observing each post and one or more subsequent interactions.

First, there are a number of attributes that may be selected, such as a post's creation or local time of day/week/year, received time of day/week/year, topic, sentiment, length of post, number of comments, geographic location, number of endorsements, number of follow-up comments, media type or types, indication that the question was answered or not, and the poster's identity (known party, previously encountered alias), partial identity (e.g., user of "gmail," self-identified owner of a certain product or type of product, etc.), and relationship (customer, vendor, partner, employee, etc.). It should be noted that most any information included in a post, post meta-data, and/or post context may be utilized as an attribute.

Second, a statistical model may use any combination of the attributes to model a number useful metrics, including time to expected user answer and time to expected poster follow-up.

Third, a method where some of the attributes may be used as predefined heuristics can be used in combination with the statistical model. Examples include: 1. Any post of negative sentiment submitted during off hours should be routed to an agent (since a response by the public users may have an unacceptable delay). 2. Posts by those known to the business are routed to an agent immediately. 3. Positive sentiment items are ignored or routed to an agent, such as when agent utilization is low. 4. Delayed flights are addressed quickly by an agent and flight experience issues are given more time.

The examples given above can be reset during continuous monitoring by changes in the interaction. If a new comment comes in or a known problem is mentioned, all related items can be routed and addressed by an agent.

In a non-limiting example, on an iPhone® users' forum, a person in Japan asks (during US business hours) about getting to level 7 with a 3rd party game. The company monitors the forum and the post is detected. Since this is during US business hours, the software runs the statistical models and determines that a public answer may be expected in 7 hours. This is a non-critical issue, so the item is not routed but is continuously monitored. In Japan overnight, a few likes are seen but no helpful activity. In the morning, another user posts information about Level 7. The original poster expresses gratitude for the help. The invention detects that an answer has been posted and by analysis, determines that the answer was sufficient. The monitoring stops and the issue can be marked as completed.

Using the example above, if the item was not answered by an expected time, such as the next morning, the issue may be routed to an agent. An agent would be directed to provide information on the public forum to address the question. The agent might give more information and/or hints for the user to move to the next level. The item would then be marked as completed.

In a second non-limiting example, Tom posts that he is having reception problems with his cellular phone on a certain network to a public mobile device page on a general social media forum, such as Facebook. If the network, having deployed certain embodiments disclosed herein, receives the post, analyzes the potential time to a public response, and potential quality metric. The model may have been previously trained by watching the same and/or similar site, classifying post topics, and track response time based on the topics. The quality is monitored by the satisfactory response to a solution and/or manual labeling by the company of acceptable responses.

A predicted response time for the post may be determined, such as one hour based on history, time of day, subject matter, and/or other attributes. The system also predicts a quality score, such as 80%. Based on the predicted time and quality and a configuration of actions for this category by the network, the system would not route the post to an agent unless no response comes in the estimated response threshold of one hour. If a consumer advocate responds, the analysis is repeated to either close out the item or to generate another wait state for follow-up by the public community. If no response is seen, the item is routed to the proper agent for response along with post details and other useful customer information. If a number of incorrect or insufficient responses are seen, then the system may respond sooner so as to curtail the spreading and/or consideration of responses that do not correctly address the post.

In one embodiment, a method is disclosed, comprising: accessing a social media website operable to receive and host posts from a community of users; identifying a post from the social media website that solicits a response; estimating a time to receive a sufficient response to the post by a member of the community of users; and upon the estimated time to receive a sufficient response being greater than a previously determined acceptable time, routing the post to a contact center agent to respond to the post on behalf of a company that is not included in the community of users.

In another embodiment, a system is disclosed comprising: a network interface; a work queue of an agent of a contact center; a processor; and wherein the processor is operable to access via the network interface a social media website operable to receive and host posts from a community of users, identify a post from the social media website that is soliciting a response, estimate the time to receive a sufficient response to the post by a member of the community of users, and upon the estimated time to receive a sufficient response being greater than a previously determined acceptable time, route the post via the network interface to the work queue of a contact center agent to respond to the post on behalf of a company that is not included in the community of users.

In yet another embodiment, a non-transitory computer readable medium is disclosed with instructions thereon that when read by the computer cause the computer to: access a social media website operable to receive and host posts from a community of users; identify a post from the social media website that is soliciting a response; estimate the time to receive a sufficient response to the post by a member of the community of users; and upon the estimated time to receive a sufficient response being greater than a previously determined acceptable time, route the post to a contact center agent to respond to the post on behalf of a company that is not included in the community of users.

The term "sufficient," "sufficiency," and variations thereof, when referring to a response to a post, shall refer to an enterprise-determined threshold of adequacy for a response to the post being met or exceeded. In one example, a sufficient response is one that contains all parts of a model answer. In another example, a reply is sufficient if it contains at least a threshold value of information compared to a model answer. In another example, a sufficient response receives an explicit acknowledgement of sufficient from the poster of the original post (e.g., "Thanks That's exactly what I needed to know.") In yet another example, a sufficient response provides only a hint or other non-explicit indicator. The enterprise may determine, in whole or in part, that sufficiency is met with respect to a response by the response receiving a threshold number of endorsements from other members of a community (e.g., a response that receives twenty "likes," ten "5 star" ratings, zero "thumbs down," less than 10% of the ratings are "2 star" or below ratings, etc.).

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
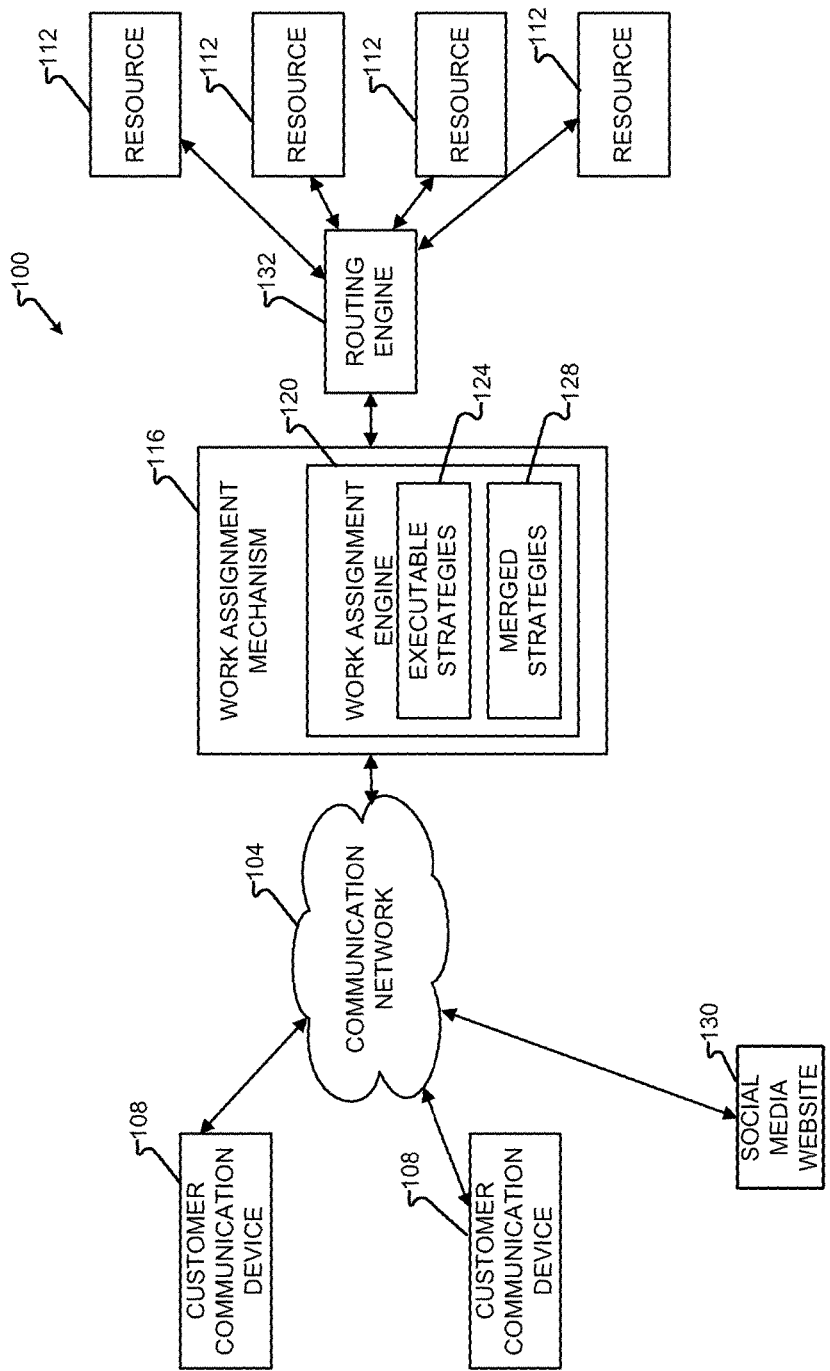
FIG. 1 depicts a first communication system in accordance with embodiments of the present disclosure.

With reference now to FIG. 1, communication system 100 will be described in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center.

More specifically, the work assignment engine 120 comprises executable strategies 124 that, when executed, enable the work assignment engine 120 to determine which of the plurality of processing resources 112 is qualified and/or eligible to receive the work item and further determine which of the plurality of processing resources 112 is best suited to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables and other data structures.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In another embodiment, social media website 130 includes one or more publicly accessible websites and may be owned and/or operated outside of the control of the contact center. Social media website 130 may include, but not limited to, Facebook, LinkedIn, Google+, and/or other general content websites; content and/or comment section of media-based social media websites (e.g., YouTube, Vine, etc.), company and/or product specific websites operable to host content/comments from others (e.g., Amazon, TigerDirect, etc.), general review websites (e.g., Yelp, AngiesList, etc.), and other websites, which include discussion boards or other comment forums available to the public. Users may provide comment (e.g., posts) on social media website 130 anonymously, under pseudonyms, and/or after being provided login credentials by the particular social media website 130.

Figure 2:
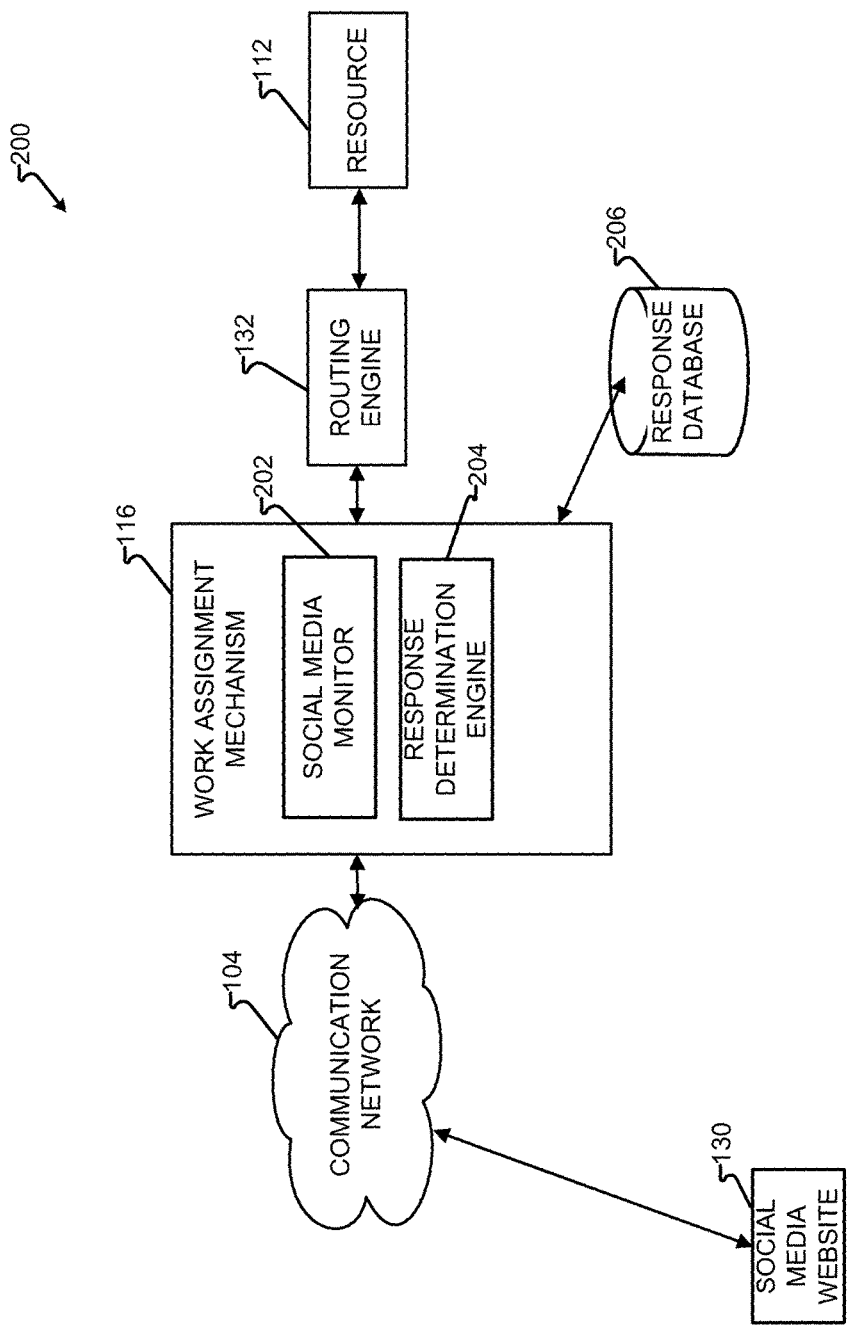
FIG. 2 depicts the communication system with social media response prediction in accordance with embodiments of the present disclosure.

FIG. 2 depicts communication system 200 with social media response prediction in accordance with embodiments of the present disclosure. Communication system 200 may be similar or identical to communication system 100, although such a similarity is not a requirement. In one embodiment, work assignment mechanism 116 includes social media monitor 202 and response determination engine 204 and is in communication with response database 206. It should be appreciated that other configurations, such as one or more of social media monitor 202, response determination engine 204, and/or response database 206 may be incorporated within or external to work assignment mechanism 116 or other component of system 200 or system 100 without departing from the disclosure herein. As a further option, social media monitor 202 and response determination engine 204 may be combined into one device or logical process which may further incorporate response database 206.

In one embodiment, a user creates a post on social media website 130. A post is more commonly text, but audio, video, image posts, as well as other posts indicating option, activity, interest, etc. and specific activities (e.g., "check-ins" etc.) are also contemplated herein. Social media monitor 202 detects the posts and determines actionability. To reduce the processing load, an initial screening of posts may be provided to eliminate further processing of posts that may be identified as not relevant to a particular enterprise. In certain other embodiments, certain keywords are identified such that only posts having those keywords are presented for further processing. Similarly, certain posts may be excluded from processing and routed directly to an agent, such as emergencies or other critical issues or posts from known or suspected customers or potential customers.

In implementations when all posts on social media monitor website 130 are presented to social media monitor 202, social media monitor 202 may discard that are not directed towards a target company ("enterprise") or product of the company. Other posts may be discarded if they are determined to not be unactionable. For example, general statements, "I like your product," "I don't like your product," are not soliciting a response and may be discarded from further processing. When social media website 130 is a general purpose website (e.g., Facebook) this may require a more explicit reference to the product or enterprise or be a follow-up post to a prior posts that provides such an explicit reference, which may be a proper name or a known alias or nickname for the company or product (e.g., "Ma Bell," "ATT," or "AT&T" for "American Telephone & Telegraph", "Big Blue" or "IBM" for "International Business Machines," etc.). However, certain other social media websites 130 are organized by topic therefore any post within a target topic may be determined to be relevant to the enterprise. In other embodiments, the subject name may be derived from an implied reference. For example, a forum discussing cellular telephones may have a post that includes, "5S." Within the forum of cellular telephones, "5S" may be understood to be a reference to the Apple iPhone model 5S. Similarly, "5S," when accompanied by other terms associated with cellular phones (e.g., reception, service plans, battery life, applications, broken screen, etc.) may also be used to put the post into proper context of cellular phones and therefore, determine relevancy.

Social media monitor 202 may determine if a post is actionable, either as a separate step or as integrated with another process, such as determining relevancy. What is and is not actionable may be a matter of design choice. For example, one enterprise may chose to ignore positive posts entirely while another enterprise may want to always follow-up with the poster, such as to thank them for their comment, and still another enterprise may wish to follow up on positive comments only during times of low agent utilization. Actionability may be determined in absolute terms, at least with respect to the content of certain posts. For example, a cat video posted on an airline's Yelp page may be deemed non-actionable. However, advantages may be realized by determining actionability in conjunction with an estimated response time and/or urgency. For example, a user posting a question regarding programming a home thermostat, during temperate weather, may be considered less urgent than the same question during a time of arctic conditions. Such rules may be substantially static or highly dynamic according to objectives of the enterprise.

In another embodiment, response determination engine 204 evaluates the post and estimates the likelihood of an acceptable response to the post coming from another poster on social media website 130. Acceptability may be based on urgency of the post, estimated timeliness, and/or estimated sufficiency, such as answering a question, accuracy of the answer, completeness of an answer, etc. Acceptability of a response may also be a matter of design choice and depend on many factors, such as subject matter. For example, a computer overheating may warrant a very fast response and require a high degree of technical accuracy and completeness to remedy the issue (e.g., "Your BIOS is configured incorrectly. Step one, . . . "), whereas a game player struggling to accomplish a goal may warrant a response in the due course of business or even warrant only a general or "hint" type of suggestive response (e.g., "Look carefully at the items you are carrying."). Responses that are merely acknowledgements, "likes," or comments such as, "I have the same problem" are preferably treated as unacceptable responses as they provide no resolution to the issue. Response determination engine 204 may access stored responses, such as stored in response database 206, to determine historical patterns and provide context to enable response determination engine 204 to estimate a predicted response. In another embodiment, the thread of posts following the response may be analyzed to determine sufficiency. For example, a reply to the response of, "that didn't help" can be determined to be negative and therefore excluded as a sufficient response. However, a response of, "Thanks!" may then indicate the response provided the information requested and, therefore, sufficient. Ratings, endorsements, or other positive sentiment in replies to the response may also be used to determine if the community found the response sufficient.

In one embodiment, response database 206 comprises records, keywords, subject matter, geographical information, temporal information, and/or other aspect to provide historical context to past posts and/or answers provided to posts from other users of social media. For example, the average response time to a post during certain times, such as early evening on Sundays in North America, may be faster than at other times, such as Friday afternoons. The response time and/or sufficiency may also vary based on the specific social media website 130. Similar factors may include subject matter, geographic region, poster identity, length of the post, time, endorsements, views, comments, sentiment, etc. Sentiment may be considered with respect to the amount of time a post remains without a response. For example, a post with a negative sentiment received during non-business hours may not receive a response from the community for some time, however, members outside of the community (e.g., potential customers in other time zones) may see the post. Therefore, posts with negative sentiments during periods with a long estimated time for a response, may be routed to an agent sooner than if such a post occurred during other times. Response determination engine 204 may then access the records of response database 206 and base an estimated acceptable response thereon. In another embodiment, response determination engine 204, social media monitor 202, and/or other component or system may provide data to populate records of response database 206.

Response determination engine 204, if it determines an appropriate response is likely to be provided by another party may signal social media monitor 202 to watch the post. If no response, or no acceptable response, is provided by another party within the threshold of time estimated by response determination engine 204, then work assignment mechanism 116 may signal routing engine 132 and, in turn, signal resource 112 to respond to the post.

In another embodiment, communication system 200 is, at least in part, self-learning. As can be appreciated, providing a response posts before a reasonable amount of time has passed to allow the community of other users to respond, would alter the dynamic of the community of users. Such a system would be unable to accurately determine response times of the community (e.g., if a response is provided in two minutes, it would be unknown if the community would respond in three minutes or some longer time period). Similarly, the community of users may be dissuaded from responding if an agent's imminent response is expected.

Communication system 200 may be initially operated to not route posts, or certain posts, to agents so that a baseline of community response times may be determined regardless of time or at least with respect to a previously determined maximum wait time. Additionally, posts with community responses may be analyzed to determine predictive attributes. For example, certain users, keywords, topics, times of day, etc. may all be associated with times for response. Response determination engine 204 may then receive a post from social media website 130 and, based on one or more of the predictive attributes, determine a likely time for a sufficient response. Communication system 200 may also consider a maximum wait time and if the likely time for a sufficient response is greater than the maximum wait time, the post may be routed to an agent for processing immediately or preferably at least prior to the maximum wait time.

Communication system 200 may also train the community of users. For example, if social media website 130 routinely receives posts related to a particular game having puzzles to solve, the community may become more involved if other users offer assistance, even incorrect assistance. Such a behavior may be cultivated by embodiments described herein, such as by routing posts to agents only upon the post aging for a length of time. Similarly, a degree of actual or apparent randomness or unpredictability may make the community unsure if an agent's reply is forthcoming and promote community involvement.

Communication system 200 may consider certain normal behaviors, often associated with a community, subject matter, specific social media website 130, etc. For example, one community of users may have a tendency to be more negative (e.g., "trolls," "haters," etc.) and, as a result, a negative post, number of negative posts, severity of negative posts, etc. from one or more members of the community, or a specific social media website 130 with a large population of such individuals, may be discounted as normal. Whereas another community of users (e.g., retired persons learning the Internet) may be more subdued and reserved. Accordingly, a negative post from such a community may be treated as more serious. Social media monitor 202 may determine such a general sentiment of all posts for a community or a particular social media website 130 by determining sentiment for other topics or even all other topics.

Figure 3:
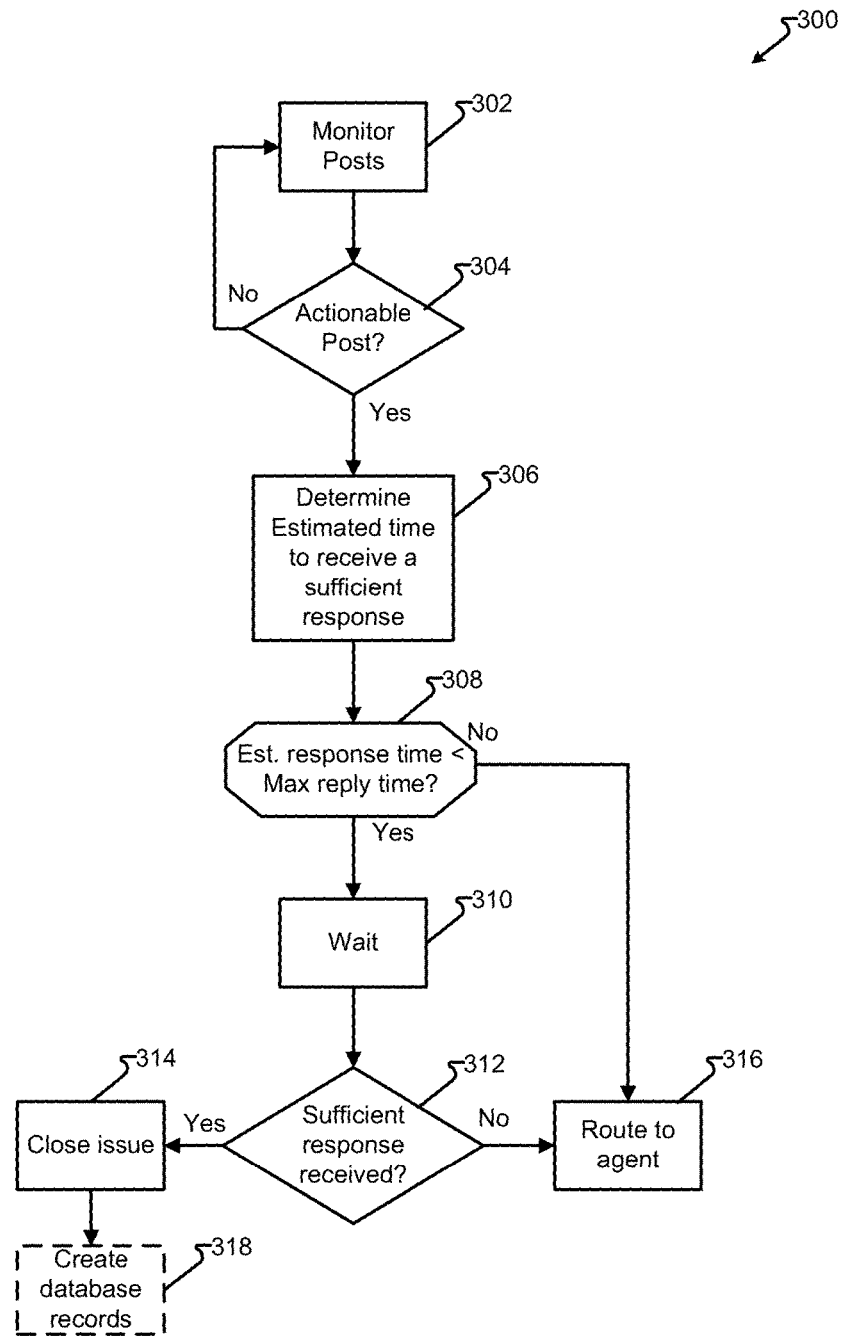
FIG. 3 depicts a processes in accordance with embodiments of the present disclosure.

With reference now to FIG. 3, process 300 will be described in accordance with at least some embodiments of the present disclosure. In one embodiment, step 302 monitors posts, such as social media monitor 202 monitoring and/or receiving data from social media website 130. Step 304 determines if a post is actionable. For example, is it relevant to a particular enterprise and is the post soliciting a response either directly, such as by asking a question, or indirectly, such as by stating a view that warrants a reply. If yes, processing continues to step 306, if not, processing may continue back at step 302.

Step 306 determines an estimated time to receive a sufficient response, such as by response determination engine 204 having access to response database 206. Based on one or more post attributes, post creator attributes, and/or website (e.g., social media website 130) attributes, historical response attributes, historical post attributes, or other attribute associated with a current post or past post and related responses, an estimated response time is determined. Step 308 determines if the estimated response time is less than, or equal to, a maximum acceptable reply time. The maximum acceptable reply time may be determined, in part, by subject matter, urgency, sentiment, poster identity, length, endorsements, and/or other factor as determined as a matter of design choice. If the estimated response time is less than the maximum acceptable time, processing continues to step 310 otherwise to step 316.

In another embodiment, portions of process 300 may be reordered. In one such reordering, step 306 determines an estimated time to receive a response then, step 310 waits for a period of time. Step 310 continues to step 312 which determines if an acceptable response is received. If yes, processing continues to step 314. If no, processing continues back to step 306, which may revise the estimated time to receive a response. The revision provided by step 306 may be due to the detection of an ongoing dialog whereby responses are received but, as of yet, not an acceptable response. Accordingly, it may be desirable to provide additional time to determine if the community of users will ultimately provide a sufficient response. If step 312 then determines than a sufficient response, despite the presence of other responses, has not occurred, then processing may continue to step 316 for an agent to respond. In addition to the foregoing, other additions, deletions, and reorderings may be implemented without departing from the teachings herein.

Step 310 waits until an acceptable response is detected on social media website 130 or until the passage of the length of time, which may be the maximum acceptable time or another length of time. For example, an enterprise may expect an acceptable response in one length of time but if one is not received, it may cause an agent to respond sooner or later. If step 312 determines a sufficient response was receive, processing continues to step 314 and the issue is closed. Optionally, a record of the post, reply, and/or attributes of the post and/or reply are preserved in response database 206 and may be accessed to estimate subsequent estimated times to receive a sufficient response. However, if no sufficient response is received, processing continues to step 316 whereby an agent is notified to respond accordingly.

Optionally, step 318 creates database records, such as to be maintained in response database 206. In one embodiment, the sufficient response is analyzed with respect to one or more attributes. As further described above, the one or more attributes selected is a matter of design choice and may be any aspect of the content of the post, meta-data of the post, and/or context of the post. A few of the nearly endless examples include, a post from a celebrity receives a sufficient response in twenty minutes, a post on Facebook regarding a flight delays received a sufficient response in two hours, a post made on Thursday at 7:00 AM Eastern Time receive a sufficient response in ten hours, a post with the keyword, "crash" on Amazon with respect to a particular product received a sufficient response in thirty hours, etc.

As a benefit, self-learning may occur. In an ideal situation, a large number of posts are received with only one difference and the difference may then be associated with an average response time. For example, a large number of identical posts but with half posted on a message board of a cellular telephone specific website and half posted on a generic review site would allow the impact of the two websites to be highly predictive of the response time to obtain a sufficient reply. However, in real-world applications limiting the variables is much more difficult as one post is invariably different from another post in many ways, even if the "gist" is the same.

In a further embodiment, the content of posts may be analyzed and certain attributes will eventually be revealed as predictive or not. For example, on a computer discussion board, the term, "fire" may be highly correlated with response times shorter than the mean response time for all posts on the same computer discussion board. Accordingly, "fire" may be determined to be predictive and messages with the word "fire" are associated with, for example, the average response time for all posts on the computer discussion board minus two hours. Similarly, the word "bus" may be associated with a response time nearly identical to the average response time for all posts and either not utilized or utilized but weighted or otherwise considered as predictive of an average response time. As can be appreciated, mean, median, mode, standard deviation, quartiles, and other statistical operations may be implemented. As a benefit a normalize value may be determined, such that, a post with a large number of attributes may have attributes thereof analyzed and a single value until a sufficient response is expected then determined. In other embodiments, a range, band, probability, or other value may be utilized. For example, a post may be determined to have attributes, that when normalized across a plurality of historical posts and common attributes, has an estimated time to receive a sufficient response of 20 hours plus-or-minus 2 hours. Another post may have an 80% probability of being answered in less than 10 hours.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   accessing, by a server comprising at least one processor and a network interface, a social media website operable to receive and host posts from a community of users;
   selecting, by the server, a post from the social media website that solicits a response and wherein the post is associated with a company;
   estimating, by the server, a time to receive a sufficient response to the post by a member of the community of users, the community of users being devoid of contact center agents working on behalf of the company, from at least one prior post, having a similar subject matter, until at least one sufficient prior response was received;
   upon the estimated time to receive a sufficient response being greater than a previously determined acceptable time, routing, by the server via the network interface, the post to a contact center agent to provide the sufficient response to the post on behalf of a company that is not included in the community of users; and
   upon the estimated time to receive the sufficient response not being greater than a previously determined time, omitting routing the post to the contact center agent.

2. The method of claim 1, further comprising:
   upon, the server determining, the estimated time to receive a sufficient response is not greater than the previously determined acceptable time:
   monitoring, by the server, the social media website; and
   upon the server determining that a period of time since the post was posted has lapsed and no sufficient response to the post has been posted, routing the post to the contact center agent to respond to the post.

3. The method of claim 2, wherein the period of time is the estimated time to receive a sufficient response.

4. The method of claim 1, wherein the step of estimating the time to receive a sufficient response, further comprises:
   determining, by the server, at least one attribute of the post;
   accessing, by the server, a database having a number of records of the at least one attribute and a response time for which a historical post having the at least one attribute received a sufficient response from the member of the community of users; and
   determining, by the server, a representative response time in accord with the historical post.

5. The method of claim 4, wherein the step of determining the representative response time for the post further comprises normalizing the representative response time by applying an adjustment factor comprising, at least one of, the number of records, the time of day of the post, the day of the post, the time of day the post was accessed, the day the post was identified, the number of the at least one attributes, the identity of the post creator, the alias of the post creator, the geographic origin of the post, the subject of the post, the sentiment of the post, keywords importance, the identity of the social media website, the number of endorsements of the post, the length of the post, media of at least a portion of the post, and the number of comments from the community of users to the post.

6. The method of claim 4, wherein the step of determining at least one attribute of the post, further comprises, selecting at least one of, the time of day of the post, the day of the post, the time of day the post was identified, the day the post was identified, the identity of the post creator, the alias of the post creator, the geographic origin of the post, the IP address of the post creator, the subject of the post, the sentiment of the post, keyword, the identity of the social media website, the number of endorsements of the post, the length of the post, media of at least a portion of the post, and the number of comments from the community of users to the post.

7. The method of claim 1, further comprising:
waiting the estimated time to receive the sufficient response;
upon identifying, by the server, at least one reply to the post as not a sufficient response, modifying the estimated time to receive the sufficient response; and
upon the adjusted estimated time to receive the sufficient response passing without receiving the sufficient response, performing, by the server, the step of routing the post to the content center agent.

8. The method of claim 1, wherein the sufficient response, further comprises a response to the post that is, at least one of, followed by another post from the post creating expressing gratitude, followed by another post from the post creating expressing sufficiency, a number of endorsements by the community of users indicating sufficiency, and a lack of subsequent posts critical of the response.

9. The method of claim 1, further comprising:
monitoring, by the server, the social media website;
upon determining, by the server, that a sufficient response to the post has been posted, analyzing the sufficient response with respect to at least one post attribute; and
at least one of storing or updating a database record comprising the at least one post attribute and associated response time.

10. A system, comprising:
a network interface;
a work queue of an agent of a contact center;
a processor; and
wherein the processor is operable to access via the network interface a social media website operable to receive and host posts from a community of users, the community of users being devoid of contact center agents working on behalf of a company, select a post from the social media website that is soliciting a response and is associated with the company, estimate the time to receive a sufficient response to the post by a member of the community of users from at least one prior post, having a similar subject matter, until at least one sufficient prior response was received, and upon the estimated time to receive a sufficient response being greater than a previously determined acceptable time, route the post via the network interface to the work queue of a contact center agent to provide the sufficient response to the post on behalf of a company that is not included in the community of users.

11. The system of claim 10, further comprising:
a database, having a number of records of the at least one attribute and a response time for which a historical post having the at least one attribute received a sufficient response from the member of the community of users; and
wherein the processor, is operable to perform the step of estimating the time to receive the sufficient response, by being operable to determine at least one attribute of the post, access the database, and determining a representative response time for the post in accord with the historical post.

12. A system comprising:
means for accessing a social media website operable to receive and host posts from a community of users;
means for selecting a post from the social media website that is soliciting a response and wherein the post is associated with a company;
means for estimating the time to receive a sufficient response to the post by a member of the community of users, the community of users being devoid of contact center agents working on behalf of the company, from at least one prior post, having a similar subject matter, until at least one sufficient prior response was received;
upon the estimated time to receive a sufficient response being greater than a previously determined acceptable time, means for routing the post to a contact center agent to provide the sufficient response to the post on behalf of a company that is not included in the community of users; and
upon the estimated time to receive the sufficient response not being greater than a previously determined time, omitting routing the post to the contact center agent.

13. The system of claim 12, further comprising:
upon the means for estimating the time to receive a sufficient response being estimated as not being greater than the previously determined acceptable time, the system further comprises:
means for monitoring the social media website; and
upon determining that a period of time since the post was posted has lapsed and no sufficient response to the post has been posted, means for routing the post to the contact center agent to respond to the post.

14. The system of claim 13, wherein the period of time is the estimated time to receive a sufficient response.

15. The system of claim 12, further comprising:
means for determining at least one attribute of the post;
means for accessing a database having a number of records of the at least one attribute and a response time for which a historical post having the at least one attribute received a sufficient response from a member of the community of users; and
means for determining a representative response time for the post in accord with the historical post.

16. The system of claim 15, wherein the means for determining the representative response time for the post further comprises means for normalizing, as the determined representative response time for further posts, the representative response time by applying an adjustment factor comprising, at least one of, the number of records, the time of day of the post, the day of the post, the time of day the post was identified, the day the post was identified, the number of the at least one attributes, the identity of the post creator, the alias of the post creator, the geographic origin of the post, the subject of the post, the sentiment of the post, keywords importance, the identity of the social media website, the number of endorsements of the post, the length of the post, media of at least a portion of the post, and the number of comments from the community of users to the post.

17. The system of claim 15, wherein the means for determining the at least one attribute of the post, further comprises, means for selecting as the determined at least one attribute at least one of, the time of day of the post, the day of the post, the time of day the post was undefined, the day the post was identified, the identity of the post creator, the alias of the post creator, the geographic origin of the post, the IP address of the post creator, the subject of the post, the sentiment of the post, keyword, the identity of the social media website, the number of endorsements of the post, the length of the post, media of at least a portion of the post, and the number of comments from the community of users to the post.

18. The system of claim 12, further comprising:
   means for waiting the estimated time to receive the sufficient response;
   upon identifying at least one reply to the post as not a sufficient response, means for modifying the estimated time to receive the sufficient response; and
   upon the adjusted estimated time to receive the sufficient response passing without receiving the sufficient response, means for performing the step of routing the post to the content center agent.

19. The system of claim 12, wherein the sufficient response, is determined by means for determining that a response to the post that is, at least one of, followed by another post from the post creating expressing gratitude, followed by another post from the post creating expressing sufficiency, a number of endorsements by the community of users indicating sufficiency, and a lack of subsequent posts critical of the response.

20. The system of claim 12, further comprising:
   means for monitoring the social media website;
   upon determining that a sufficient response to the post has been posted, means for analyzing the sufficient response with respect to at least one post attribute; and
   means for at least one of storing or updating a database record comprising the at least one post attribute and associated response time.

* * * * *